(12) United States Patent
Sakamoto et al.

(10) Patent No.: US 7,982,834 B2
(45) Date of Patent: Jul. 19, 2011

(54) LIQUID CRYSTAL DISPLAY DEVICE AND TERMINAL UNIT

(75) Inventors: Michiaki Sakamoto, Kawasaki (JP); Kenichi Mori, Kawasaki (JP)

(73) Assignee: NEC LCD Technologies, Ltd, Kanagawa (JP)

( * ) Notice: Subject to any disclaimer, the term of this patent is extended or adjusted under 35 U.S.C. 154(b) by 359 days.

(21) Appl. No.: 12/185,647

(22) Filed: Aug. 4, 2008

(65) Prior Publication Data
US 2008/0297674 A1 Dec. 4, 2008

(30) Foreign Application Priority Data
May 18, 2007 (JP) .................. 2007-133432

(51) Int. Cl.
*G02F 1/1335* (2006.01)
*G02F 1/1343* (2006.01)
(52) U.S. Cl. ........................ 349/114; 349/141
(58) Field of Classification Search .......... 349/114, 349/141
See application file for complete search history.

(56) References Cited

U.S. PATENT DOCUMENTS
2007/0222927 A1* 9/2007 Uehara et al. ............. 349/117

FOREIGN PATENT DOCUMENTS

| JP | 2003-344837 A | 12/2003 |
|----|---------------|---------|
| JP | 2005-338256 A | 12/2005 |
| JP | 2006-71977 A | 3/2006 |
| JP | 2006-139286 A | 6/2006 |
| JP | 2006-171376 A | 6/2006 |
| JP | 2007-041572 A | 2/2007 |
| JP | 2007-133432 A | 5/2007 |

* cited by examiner

*Primary Examiner* — James A Dudek
(74) *Attorney, Agent, or Firm* — Sughrue Mion, PLLC

(57) ABSTRACT

A liquid crystal display (LCD) device includes: a liquid crystal (LC) panel defining thereon an array of pixels each including a reflective area driven in a longitudinal electric field and a transmissive area driven in a lateral electric field; a quarter-wavelength retardation film disposed in the reflective area in front of a LC layer; and first and second polarizing films sandwiching therebetween the LC panel. The LC molecules in the LC layer have a major axis parallel or perpendicular to an optical axis of the first polarizing film disposed in front of the LC panel.

18 Claims, 12 Drawing Sheets

REFLECTIVE AREA 24

TRANSMISSIVE AREA 25

REFLECTIVE AREA 24

TRANSMISSIVE AREA 25

REFLECTIVE AREA 24

TRANSMISSIVE AREA 25

FIG. 9A
FIG. 9B
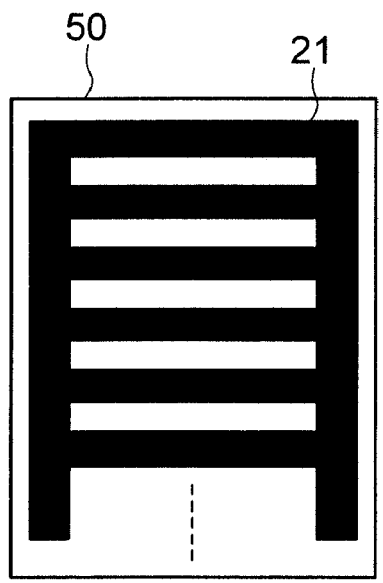
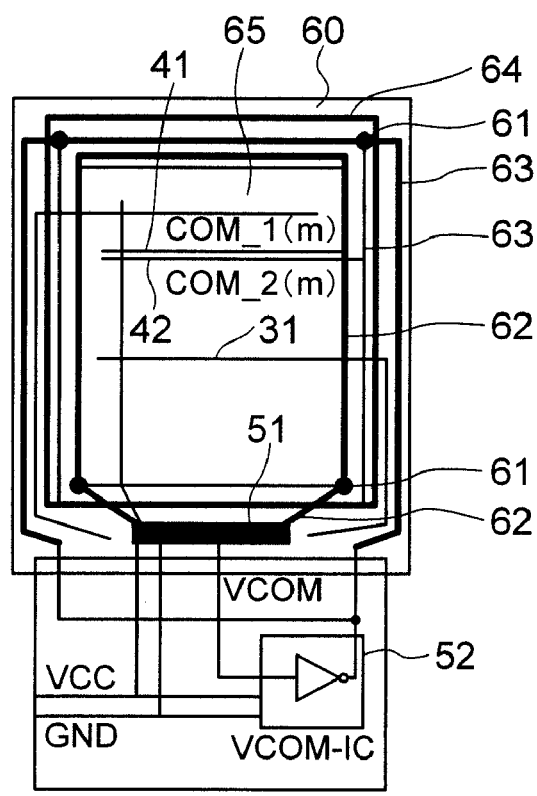

LIQUID CRYSTAL DISPLAY DEVICE AND TERMINAL UNIT

FIELD OF THE INVENTION

The present invention relates to a liquid crystal display (LCD) device and a terminal unit and, more particularly, to a LCD device including a reflective area and a transmissive area in each pixel and a terminal unit including the LCD device.

BACKGROUND OF THE INVENTION

There is known a transflective LCD device including a reflective area and a transmissive area in each pixel of the LCD device. If the transmissive LCD device uses a lateral-electric-field mode, such as an IPS (in-plane-switching) mode or FFS (fringe-field-switching) mode, in the transmissive area, and a longitudinal electric field in the reflective area, there is a problem wherein the reflective mode represents a bright state at any time irrespective of whether or not a voltage is applied to a liquid crystal LC) layer in the reflective area, although the transmissive mode functions in a normally black mode.

Patent Publication JP-2003-344837A describes a technique for solving the above problem by adopting the longitudinal electric field in the reflective area and a specific structure, wherein the angle between the polarizing axis of a polarizing film and the optical axis of the LC layer as viewed from the side of counter substrate is set at 45 degrees, differently from the normal zero degree or 90 degrees generally adopted. In this structure, however, the transmissive mode is involved with a problem that the polarized state of light is changed in the internal of the LC layer and thus has a poor image characteristic upon display of a dark state in the transmissive area.

If the lateral-electric-field mode is adopted in both the transmissive area and reflective area, there is a problem known as a black-white inversion problem wherein the reflective area assumes a normally white mode whereas the transmissive area assumes a normally black mode in a typical driving scheme. The technique for solving the black-white inversion problem by adopting a retardation film only in the reflective area is described in Patent Publications JP-2005-338256A, -2006-171376A, -2006-71977A, and -2006-139286A. This technique roughly includes two types.

The first type is such that the reflective mode uses a lateral-electric-field mode, the retardation film is disposed on the side of counter substrate and has a retardation corresponding to that of a half-wavelength film ($\lambda/2$ film, $\lambda$ is the wavelength of light), the LC layer has a retardation corresponding to that of a quarter-wavelength film ($\lambda/4$ film), and the reflection film is disposed at rear side of the LC layer, whereby the reflective mode operates in the normally black mode.

The second type is such that the reflective mode uses a lateral-electric-field mode, the counter substrate is not provided with a retardation film, the LC layer acts as a $\lambda/2$ film, a $\lambda/4$ film is disposed at the rear side of the LC layer, and the reflection film is disposed at the rear side of the $\lambda/4$ film, whereby the reflective area functions in the normally black mode. In both the first and second techniques, the combination of LC layer and retardation film acts as a wideband $\lambda/4$ film upon display of a dark state.

JP-2005-338256A introduces the $\lambda/2$ film in the reflective area to solve the above black-white inversion problem. More specifically, the IPS-mode transmissive LCD device using the lateral-electric-field includes a polarizing film that covers the entire pixel area as in the case of a transmissive LCD device, a retardation film having a retardation of $\lambda/2$ in the reflective area, and a LC layer having a retardation of $\lambda/4$ in the reflective area.

JP-2007-41572A describes a LCD device wherein the reflective mode uses a first gray-scale level signal, and the transmissive mode uses a second gray-scale level signal which is obtained by inverting the first gray-scale level signal, to solve the black-white inversion problem. This technique is referred to as a signal-inverting drive scheme, and the relationship between both the drive signals is referred to as an inverted-polarity relationship. FIG. 12 shows the configuration of a pixel in the LCD device described in this patent publication. The pixel 50 includes a reflective area 51 which includes a first pixel electrode 55 and a first common electrode 53, and a transmissive area 52 which includes a second pixel electrode 56 and a second common electrode 54. The liquid crystal (LC) layer in the reflective area 51 is driven by an electric field generated between the first pixel electrode 55 and the first common electrode 53, whereas the LC layer in the transmissive area 52 is driven by an electric field generated between the second pixel electrode 56 and the second common electrode 54. The first and second pixel electrodes 55, 56 are applied with the same pixel signal through respective thin film transistors (TFTs).

In the LCD device of FIG. 12, a first common-electrode signal, which is applied to the first common electrode 53 in the transmissive area 51, is inverted to generate a second common-electrode signal, which is applied to the second common electrode 54 in the transmissive area 52, to thereby uses a signal-inverting drive scheme. In this configuration, the LC layer in the reflective area 51 is applied with 5V, whereas the LC layer in the transmissive area 52 is applied with 0V. Thus, the optical axis or major axis of LC molecules in the LC layer are turned only in the reflective area 51 by the applied voltage, to solve the black-white inversion problem.

In the techniques described in JP-2007-41572A and -2005-338256A, the transmissive mode uses a lateral electric field and the major axis of the LC molecules in the LC layer is parallel or perpendicular to the optical axis of the polarizing film, that is, the optical axis of the LC layer has no effective angle with respect to the incident linearly-polarized light. In this case, the optical axis of the LC layer does not change the polarized state of the linearly-polarized light after passing through the LC layer, whereby the incident light and emitted light remain in the linearly-polarized state irrespective of the retardation of the LC layer. Thus, if the optical axis of the polarizing film disposed at the light emitting side is set perpendicular to the emitted light, the LC layer represents a dark state irrespective of the retardation of the LC layer. That is, the dark state obtained by the LCD device has a lower viewing angle dependency, lower chromaticity dispersion, and less dependency of the gap distance of the LC layer.

On the other hand, in the reflective area of the LCD device described in JP-2007-41572A and -2005-338256A, the major axis of the LC molecules is 45 degrees deviated from the polarized direction of the incident light upon display of a dark state, and the LC layer has a retardation of $\lambda/4$ and thus acts as a $\lambda/4$ film. In this configuration, the incident linearly-polarized light is changed to a circularly-polarized light by the function of the LC layer and reflection film to represent the dark state. The two publications use different techniques at this stage. In the technique described in JP-2005-338256A, the $\lambda/2$ film is disposed only in the reflective area to rotate the incident light to achieve the 45 degrees between the incident light and the major axis of the LC molecules only in the reflective area. In the technique described in JP-2007-

41572A, the driving scheme rotates the LC molecules only in the reflective area by 45 degrees to achieve an angle of 45 degrees between the incident light and the major axis of the LC molecules only in the reflective area.

As described heretofore, in the techniques described in JP-2007-41572A and -2005-338256A, the LC molecules in the LC layer in the reflective area have a major axis which is 45 degrees deviated away from the polarized direction of the linearly-polarized incident light upon display of a dark state. This causes a change of the polarized state of the linearly-polarized light within the LC layer, and thus the dark state can be achieved after the incident light reaches the reflection film and turned to a circularly polarized light. Accordingly, the incident light is subjected to wavelength dispersion by the LC layer due to the birefringence thereof, which depends on the wavelength of the incident light as well as the gap distance of the LC layer, whereby the dark state achieved in the reflective area has a viewing angle dependency and chromaticity dispersion. In addition, the gap distance dependency causes fluctuation of the black luminance to degrade the contrast ratio upon display of the dark state. Thus, although the lateral-electric-field-mode transflective LCD device is superior, in the performance such as the contrast ratio and viewing angle dependency, to the longitudinal-electric-field-mode transflective LCD devices in the transmissive mode, the lateral-electric-field-mode transflective LCD device is inferior in the reflective mode to those longitudinal-electric-field-mode LCD devices in the performance such as the contrast ratio.

In the LCD device wherein the reflective area operates in a longitudinal-electric-field mode and the transmissive area operates in a lateral-electric-field mode, as described in JP-2003-344837A, if the ordinary optical system is adopted, the LC layer does not perform an ON/OFF operation in the reflective mode, although the transmissive mode effectively functions as a normally block mode. In addition, if 45 degrees is adopted as the angle between the optical axis of the polarizing film and the optical axis of the LC layer as observed normal to the substrate, the transmissive area assumes a normally white mode, whereby the polarized state of the incident light is changed within the internal of LC layer upon display of a dark state, thereby causing a lower contrast ratio in the transmissive area.

As described heretofore, the transflective LCD devices described in the patent publications have the common problem of lower contrast ratio at least in one of the transmissive area and reflective area.

SUMMARY OF THE INVENTION

In view of the above, it is an object of the present invention to provide a transflective LCD device which operates in a lateral-electric-filed mode in the transmissive area and yet is capable of achieving a higher contrast ratio in both the reflective area and transmissive area.

The present invention provides a liquid crystal display device including: a liquid crystal panel which includes first and second substrates sandwiching therebetween a liquid crystal layer and defines an array of pixels each including a reflective area and a transmissive area, the transmissive area including a first pixel electrode and a first common electrode for generating therebetween a lateral electric field, the reflective area including a second pixel electrode and a counter electrode for generating therebetween a longitudinal electric field; a quarter-wavelength retardation film disposed in the reflective area in front of the liquid crystal layer; and first and second polarizing films sandwiching therebetween the liquid crystal panel, liquid crystal molecules in the liquid crystal layer having a major axis parallel or perpendicular to an optical axis of the first polarizing film disposed in front of the liquid crystal panel.

The above and other objects, features and advantages of the present invention will be more apparent from the following description, referring to the accompanying drawings.

BRIEF DESCRIPTION OF THE DRAWINGS

FIGS. 9A and 9B are top plan views of the counter substrate and TFT substrate, respectively.

DETAILED DESCRIPTION OF THE INVENTION

Figure 1:
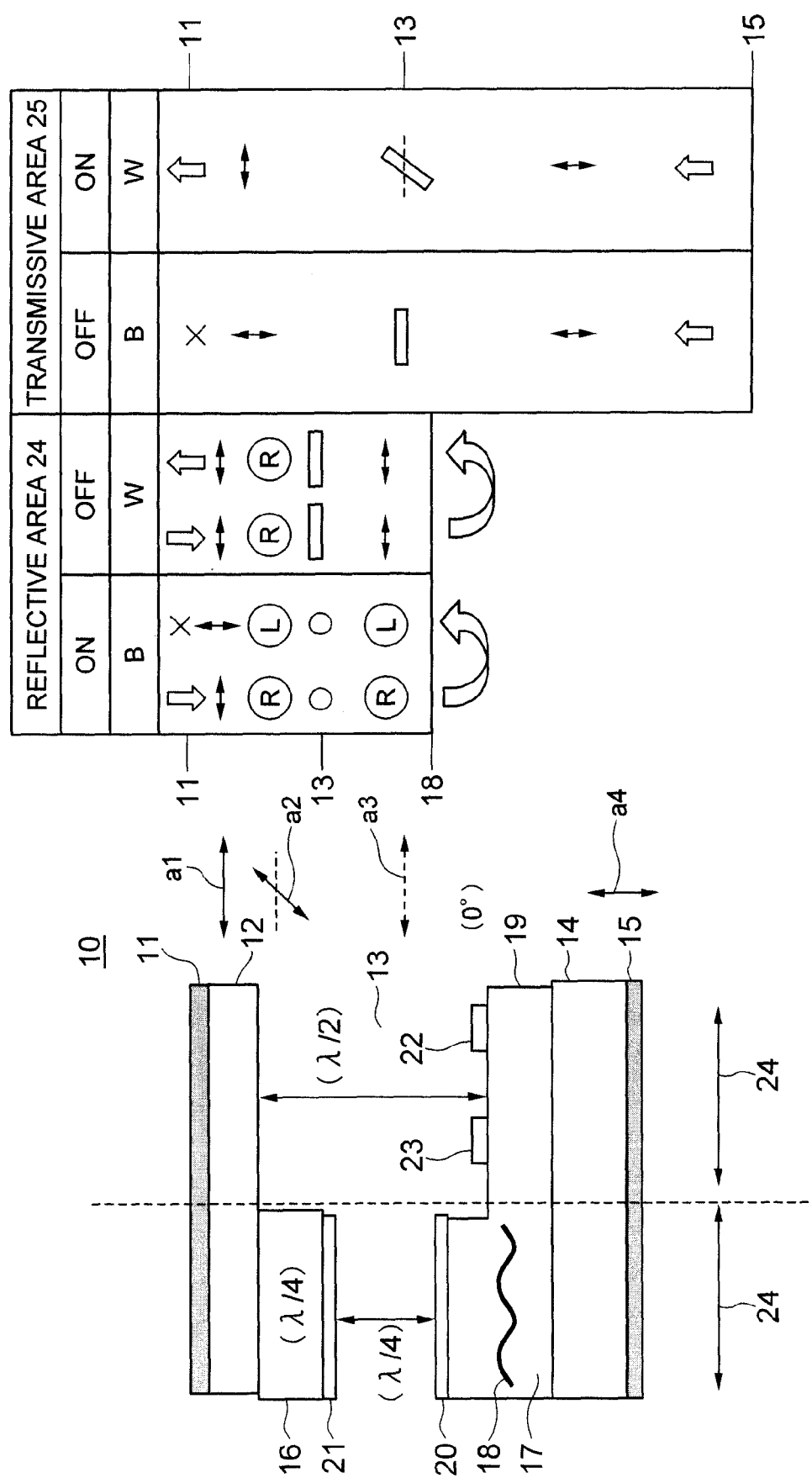
FIG. 1A is a sectional view of a pixel in a LCD device according to an embodiment of the present invention.
FIG. 1B is a schematic operation diagram of the pixel shown in FIG. 1A.

Before describing embodiments of the present invention, investigation for transflective LCD devices conducted by the present inventors will be described for a better understanding of the present invention. We considered to allow the transmissive area of the transflective LCD devices to acquire superior contrast ratio and viewing angle dependency equivalent to those of the transmissive LCD device operating in a lateral-electric-field mode. For this purpose, it may be effective for the transflective LCD device to adopt the configuration wherein the relationship between the optical axis of the LC layer and the optical axis of the polarizing films at least in the transmissive area is equivalent to the corresponding relationship in the transmissive LCD device. In this situation, we adopted the configuration wherein the major axis of the LC molecules is parallel or perpendicular to the optical axis of the rear-side (incident-side) polarizing film, and the optical axis of the front-side (light-emitting-side) polarizing film is perpendicular to that of the incident-side polarizing film, to achieve the object of the present invention.

In addition, we adopted a longitudinal-electric-field drive in the reflective area, to increase the aperture ratio by allowing the incident light and the emitting light compensate each other in the reflective area. In this configuration, it is necessary to solve the problem that the reflective area represents a bright state at any time irrespective of presence or absence of the applied voltage, which results from the fact that the LC layer in the reflective layer does not perform the ON/OFF operation. The reason for the absence of ON/OFF operation in the reflective area is that, although the LC layer generally has a refractive-index anisotropy against an arbitrary light upon absence of the applied voltage, the incident light is insensitive to the refractive-index anisotropy of the LC layer because the polarized plane of the incident light is parallel to the optical axis of the LC layer. Additional reason is that the LC layer looses the refractive-index anisotropy against any arbitrary light upon presence of the applied voltage because the LC molecules rise upon the presence of the applied voltage. Thus, we considered to insert a λ/4 film in the reflective area in order for suppressing these phenomenon. This structure provided a normally-whiter-mode operation to the reflective area, wherein the LC layer represents a bright state upon absence of the applied voltage and a dark state upon presence of the applied voltage, instead of the operation wherein the LC layer represents a bright state at any time.

In the above configuration, the features of the present invention include the optical arrangement wherein the optical axis of one of the polarizing films is parallel to the major axis of the LC molecules. This arrangement alone, however, does not allow the LC layer to change the polarized state of the incident light. Thus, the features of the present invention also include an additional arrangement wherein the λ/4 film is provided in the reflective area to change the linearly-polarized incident light into a circularly-polarized light to allow the incident light to loose the sensitivity to the major axis of the LC molecules, thereby achieving the ON/OFF operation of the LC layer in the reflective area. The configuration of the present invention achieved the operation in that the LC layer in the reflective area is driven in the longitudinal-electric-field mode, whereas the LC layer in the transmissive area is driven in the lateral-electric-field mode while adopting a normal optical arrangement in the transmissive area similar to the arrangement of the typical transmissive LCD device. It is to be noted that, in a typical ECB(electrically-controlled birefringence)-mode LCD device, the provision of a λ/4 film is adopted to only convert a normally black mode to a normally white mode.

Now, an exemplary embodiment of the present invention will be described in detail with reference to the accompanying drawings. FIG. 1A shows a sectional view of a pixel in a transflective LCD device according to an embodiment of the present invention, and FIG. 1B is an operation diagram of the pixel of FIG. 1A. FIG. 1A is attached with arrows a1 to a4 showing the direction of the optical axis of the corresponding constituent elements. The pixel 10 is such that the reflective area 24 is driven in a longitudinal-electric-field mode, and the transmissive area 25 is driven in a lateral-electric-field mode. This LCD device is used for user terminals, such as cellular phone, personal computer, an portable game machine. The LCD device includes a rear substrate or TFT substrate 14, a front substrate or counter substrate 12, a LC layer 13 sandwiched between both the substrates, and a backlight unit (not shown) disposed at rear side of the TFT substrate 14. The LCD device also includes a first (rear) polarizing film 15 disposed between the TFT substrate 14 and the backlight unit, and a second (front) polarizing film 11 on the front side of the counter substrate 12.

The TFT substrate 14 in the reflective area 24 mounts thereon a concave-convex film 17, a reflection film 18, a planarization film (overcoat film) 19, and a reflective-area pixel electrode 20, which are consecutively formed on the TFT substrate 14. The counter substrate 12 in the reflective area 24 mounts thereon a λ/4 retardation film 16 and a counter electrode 21, which are consecutively formed on the counter substrate 12. The reflective-area pixel electrode 20 opposes the counter electrode 21 with an intervention of the LC layer 13. The TFT substrate 14 in the transmissive area 25 mounts thereon the planarization film 19 which is common to the reflective area 24, and a transmissive-area pixel electrode 22 and a transmissive-area common electrode 23 which are formed on the planarization film 19 to drive the LC layer 13 in the transmissive area 25 in a lateral-electric-field mode or IPS mode. The LC layer 13 in the reflective area 24 has a thickness corresponding to a retardation of λ/4, whereas the LC layer 13 in the transmissive area 25 has a thickness corresponding to a retardation of λ/2, where λ is the wavelength of light. The transmissive-area pixel electrode 22 and transmissive-area common electrode 23 have a shape of comb teeth, and are referred to as a comb-teeth electrode sometimes.

In FIG. 1A, a horizontal orientation film each formed between the LC layer 13 and the layer structure formed on the TFT substrate 14 and between the LC layer 13 and the layer structure formed on the counter substrate 12 is omitted for depiction. The orientation direction of the orientation film on the TFT substrate side is parallel to the orientation direction of the orientation film on the counter substrate side, whereby the initial twisted angle of the LC layer 13 is zero degree.

Figure 2:
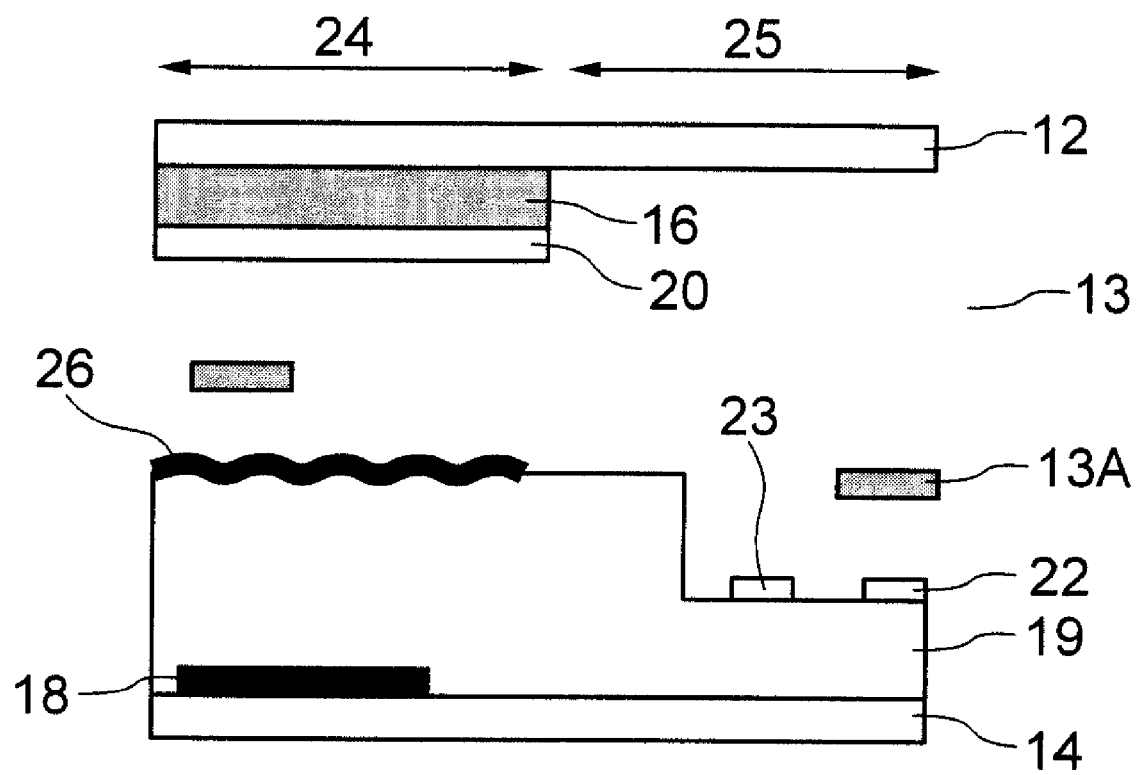
FIG. 2 is a sectional view of a pixel in a LCD device according to a modification of the embodiment.

In the LCD device, the reflective area 24 has a maximum reflectivity if the relationship $\Delta n \times d_r = \lambda/4$ holds, whereas the transmissive area 25 has a maximum transmittance if the relationship $\Delta n \times d_f = \lambda/2$ holds, where $\lambda$, $\Delta n$, $d_r$, and $d_f$ are wavelength of light, refractive-index anisotropy, gap distance (or thickness of the LC layer 13) in the reflective area 24, and gap distance in the transmissive area, respectively. In view of this fact, the gap distance $d_r$ in the reflective area 24 is set at $d_r = (\lambda/4)/\Delta n$, whereas the gap distance $d_f$ in the transmissive area 25 is set at $d_f = (\lambda/4)/\Delta n$. In the above description, the reflective-area pixel electrode 20 and the reflection film 20 are separately formed; however, these elements 20, 18 may be integrated to form a single layer as a reflective electrode. This structure is illustrated in FIG. 2, which shows a modification from the above embodiment. In FIG. 2, reflective electrode 26 is formed on the overcoat film 19 to oppose the counter electrode 20. The polarizing films are omitted for depiction. FIG. 2 also schematically shows the direction of major axis of the LC molecules 13A in the LC layer 13.

As shown in FIG. 1A, the optical axis (major axis) a3 of the LC molecules in the LC layer 13 upon absence of the applied voltage is used as a reference angle, i.e., zero degree, and the angle of each direction for the other elements is measured in a clockwise direction. The rear-side polarizing film 15 has an optical axis (polarizing axis) a4 directed at an angle of 90 degrees, the front-side or light-emitting-side polarizing film 11 has an optical axis a1 directed at an angle of zero degree, and the optical axis a2 of the λ/4 retardation film 16 is set at 45 degrees. FIG. 1B shows the operation of the LCD device in this configuration upon presence (ON) and absence (OFF) of the applied voltage for both the areas 24 and 25. In the notation of FIG. 1B, character "R" encircled means a clockwise-circularly-polarized light, characteristic "L" encircled means a counterclockwise-circularly-polarized light, and a thin arrow means the polarized direction of a linearly-polarized light. A thick blank arrow means a light "passed" by the element located there. The axis of a cylinder, which is shown as a small blank circle or a blank bar in the figure, means the direction of the major axis of the LC molecules in the LC layer 13.

Operation of the LCD device in the reflective area 24 will be described. Upon absence of a voltage applied between the reflective-area pixel electrode 20 and the counter electrode 21, a linearly-polarized incident light, which has passed through polarizing film 11 to have a polarized angle of zero degree, is passed by the λ/4 retardation film 16 to assume a clockwise-circularly-polarized light, and then passes through the LC layer 13 having a retardation of λ/4 to assume a linearly-polarized light and reach the reflection film 18. The linearly-polarized light is reflected by the reflection film 18 as it is, and then passes through the LC layer 13 to again assume a clockwise-circularly-polarized light, which passes through the λ/4 retardation film 16 to assume a linearly-polarized light having a polarized direction at zero degree and pass through the polarizing film 11, whereby the LCD device represents a bright state or white (W).

On the other hand, upon presence of a voltage applied between the reflective-area pixel electrode 20 and the counter electrode 21, the LC molecules in the reflective area 24 rise to a direction perpendicular to the initial direction. In this case, a linearly-polarized incident light, which has passed through polarizing film 11 to have a polarized angle of zero degree, is passed by the λ/4 retardation film 16 to assume a clockwise-circularly-polarized light, and then passes through the LC layer 13 as it is due to the rise of the LC molecules and reach the reflection film 18. The clockwise-circularly-polarized light is reflected by the reflection film 18 to assume a counterclockwise-circularly-polarized light, and then passes through the LC layer 13 as the counterclockwise-circularly-polarized light, which passes through the λ/4 retardation film 16 to assume a linearly-polarized light having a polarized direction at 90 degrees. The linearly-polarized light having a polarized direction at 90 degrees is absorbed by polarizing film 11, whereby the LCD device represents a dark state or black (B). Thus, the reflective area 24 operates in a normally white mode.

Operation of the LCD device in the transmissive area 25 will be described hereinafter. Upon absence of the applied voltage, a linearly-polarized incident light, which has passed through polarizing film 15 from the rear side and has a polarized angle of 90 degrees, is passed by the LC layer 13 as it is and reaches polarizing film 11. The linearly-polarized light having a polarized angle of 90 degrees is absorbed by polarizing film 11, whereby the LCD device represents a dark state or black (B). On the other hand, upon presence of the applied voltage, the LC molecules in the transmissive area 25 has an optical axis at 45 degrees. In this case, a linearly-polarized incident light, which has passed through polarizing film 15 and has a polarized angle of 90 degrees, is passed by the LC layer 13 to assume a linearly-polarized light having a polarized angle of zero degree, which is passed by the polarizing film 11, whereby the LCD device represents a bright state or white (W). Thus, the transmissive area 25 operates in a normally black mode.

It is to be noted in the above operation that the optical axis of the LC layer 13 is set at zero degree (parallel) or 90 degrees (perpendicular) with respect to the optical axis of the front polarizing film 11, in order to allow the transmissive area 25 to operate in the normal transmissive mode of a typical transmissive LCD device. It is also to be noted that the λ/4 retardation film 16 is provided only in the reflective area 24 for allowing the LC layer 13 in the reflective area 24 to perform the ON/OFF operation. It may be recited that the circularly-polarized light incident onto the LC layer 13 looses the sensitivity to the optical axis of the LC layer 13, whereby the LC layer 13 in the reflective area 24 is allowed to have an ON/OFF function against the incident light, although the optical axis of the LC layer 13 is parallel or perpendicular to the optical axis of polarizing film 11.

Figure 3A:
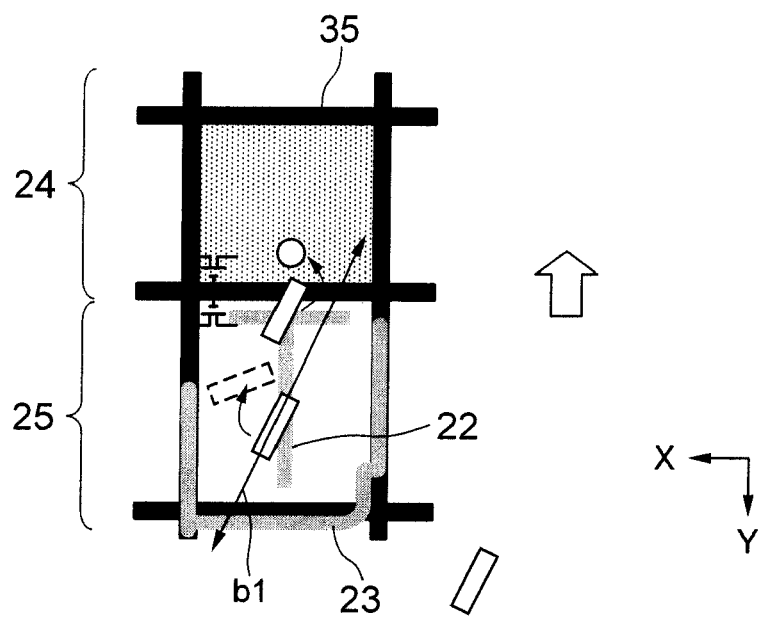
FIGS. 3A to 3C are top plan views depicting operation of the pixels shown in FIG. 1A.
Figure 3B:
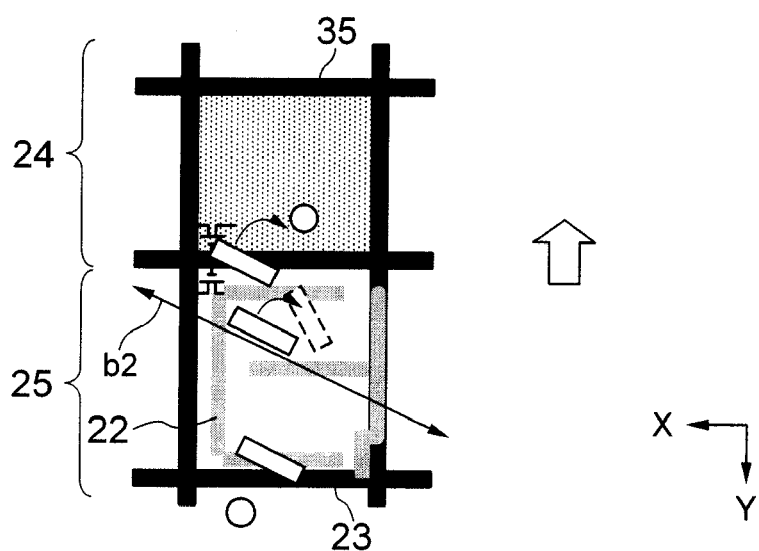
Figure 3C:
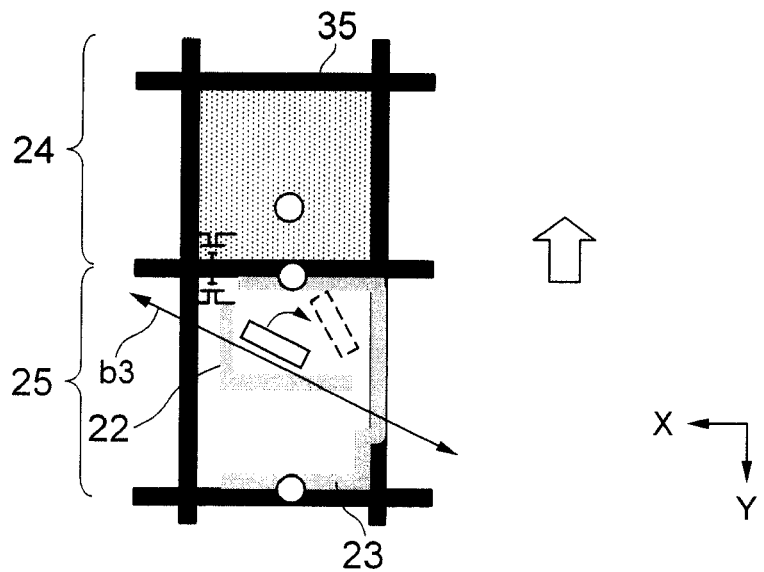

The present inventors then conducted investigation as to the optimum layout of the pixels for operating the transmissive area in the lateral-electric-field mode and reflective area in the longitudinal-electric-field mode. FIGS. 3A to 3C are top plan views of the different arrangements of a pixel thus investigated, for the case where the reflective 24 area and the transmissive area 25 are divided in the Y-direction.

FIG. 3A shows an arrangement wherein the transmissive-area pixel electrode 22 includes a comb-teeth branch extending in the Y-direction. The rubbing direction b1 of the orientation film is set at 15 degrees away from the Y-direction as measured in the clockwise direction. FIG. 3B shows another arrangement wherein the transmissive-area pixel electrode 22 includes a comb-teeth branch extending in the X-direction. The rubbing direction b2 of the orientation film is set at 105 degrees away from the Y-direction as viewed in the clockwise direction. In addition, the transmissive-area pixel electrode 22 is provided near the boundary between the transmissive area 25 and the reflective area 24, instead of the transmissive-area common electrode 23. There is no part of counter electrode 21 opposing the transmissive-area pixel electrode 22. FIG. 3C shows another arrangement wherein the transmissive-area pixel electrode 22 includes a comb-teeth branch extending in the X-direction, the rubbing direction b3 of the orientation film is set at 105 degrees away from the Y-direction as viewed in the clockwise direction, a portion of the transmissive common electrode 23 is provided near the boundary between the transmissive area 25 and the reflective area 24, and the counter electrode 21 (FIG. 1A) is provided to oppose the transmissive-area common electrode 23.

In the arrangement of FIG. 3A, a lateral electric field parallel to the comb-teeth electrode is generated at the boundary between the reflective area 24 and the transmissive area 25. It is desired that the LC molecules be turned laterally in the clockwise direction at the boundary. However, the lateral electric field parallel to the comb-teeth electrode provided a torque to turn the LC molecules in the counterclockwise direction toward the reflective area 24, which caused generation of a disclination between the LC molecules driven in the clockwise direction and the LC molecules driven in the counterclockwise direction. In addition, the boundary between an area wherein the LC molecules are driven in the lateral direction and another area wherein the LC molecules are driven in the longitudinal direction was located in the transmissive area 25 away from the boundary, whereby a disclination was observed to enter into the transmissive area 25, and degraded the image quality in the transmissive area 25 due to incurring of an afterimage or reduced contrast ratio.

In the arrangement of FIG. 3B, partly because there is no counter electrode opposing the boundary between the reflective area 24 and the transmissive area 25, a lateral electric field perpendicular to the comb-teeth electrode was generated at the boundary between the reflective area 24 and the transmissive area 25. The direction of this lateral electric filed at the boundary turned the LC molecules in the clockwise direction which coincides with the direction in which the LC molecules are driven in the transmissive area 25. This provided a continuity between the LC molecules which are driven in the lateral direction in the transmissive area 25 and the LC molecules which are driven in the longitudinal direction, thereby suppressing occurrence of a disclination entering into the transmissive area 25.

In the arrangement of FIG. 3C, there is provided a counter electrode apposing the boundary at which the transmissive-area common electrode 23 is located. Thus, a longitudinal electric field was generated at any time at the boundary to allow the LC molecules to rise at the boundary. The fact that the comb-teeth electrode is perpendicular to the lateral electric field at the boundary, as in the arrangement of FIG. 3B, provided a continuity between the LC molecules which are driven in the lateral direction in the transmissive area 24 and the LC molecules which are driven in the longitudinal direction, thereby suppressing occurrence of a disclination entering into the transmissive area 25. This experiment revealed an improved stability of the boundary. Thus, the arrangement of FIG. 3C provides an improved contrast ratio in the transmissive area 25 as well as suppression of the afterimage occurring therein.

It should be noted that the reflective area 24 operates in a normally white mode and the transmissive area 25 operates in a normally black mode, in the above example. Thus, the LCD device may use the signal-inverting drive scheme, as described before, wherein the LC molecules in both the areas are driven by two driving signals, one of which is obtained by inverting the other. In order to apply the signal-inverting drive scheme to the LCD device of the present embodiment, it is preferable to introduce a storage electrode in the reflective area for driving the LC molecules in the reflective area with a longitudinal electric field, which configuration is not described in JP-2005-338256A. Thus, the present embodiment adopts a signal-inverting drive scheme using a longitudinal electric field in the reflective area, which will be described hereinafter.

FIG. 4A shows an equivalent circuit diagram of a pixel in the LCD device driven by a method according to the present embodiment. The TFT substrate mounts thereon a plurality of gate lines 31 extending in the row direction, a plurality of data lines 32 extending in the column direction, first and second common-electrode lines 41, 42 extending in the row direction, and an array of pixels configured as a transflective pixel including the reflective area 24 and the transmissive area 25. TFTs 33 are provided as switching members for supplying pixel data to the respective reflective areas 24, and TFTs 34 are provided as switching members for supplying the pixel data to the respective transmissive areas 25. TFTs 33 have a gate connected to a corresponding gate line 31, and a source/drain current path connected between a data line 32 and a pixel electrode 20 in the reflective area 24, whereas TFTs 34 have a gate connected to a gate line 31, and a source/drain current path connected between a data line 32 and a pixel electrode 22 in the transmissive area 25.

First and second common electrodes 23, 35 are disposed in the transmissive area 25 and reflective area 24, respectively. The second common electrode (reflective-area common electrode) 35 is provided separately from the counter electrode 21 (FIG. 1A), and functions as a storage electrode providing a storage capacitance C2 in association with the reflective-area pixel electrode 20. The first common electrode (transmissive-area common electrode) 23 opposes the transmissive-area pixel electrode 22 within the TFT substrate, and functions as a reference potential line as well as a storage electrode for configuring a storage capacitance C1 in association with the transmissive-area pixel electrode 22. The counter electrode 21 opposes the reflective-area pixel electrode 20 and functions as a reference potential line therefor.

In the above configuration, the reflective-area pixel electrode 20 and the transmissive-area pixel electrode 22 are connected to TFTs 33, 34, respectively, which are connected to a common gate line 31 and a common data line 32. As a result, when the TFTs 33, 34 are turned ON, a common data signal is written into both the reflective-area pixel electrode 20 and transmissive-area pixel electrode 22. The orientation of the LC layer in the reflective area 24 is controlled by the potential difference between the reflective-area pixel electrode 20 and the counter electrode 21. On the other hand, the orientation of the LCD layer in the transmissive area 25 is controlled by the potential difference between the transmissive-area pixel electrode 22 and the transmissive-area pixel electrode 23. In the reflective area 24, the storage capacitance C2 is formed between the second common-electrode 35 and the reflective area pixel electrode 20, whereas in the transmissive area 25, the storage capacitance C1 is formed between the transmissive-area common electrode 23 and the transmissive-area pixel electrode 22.

Figure 5A:
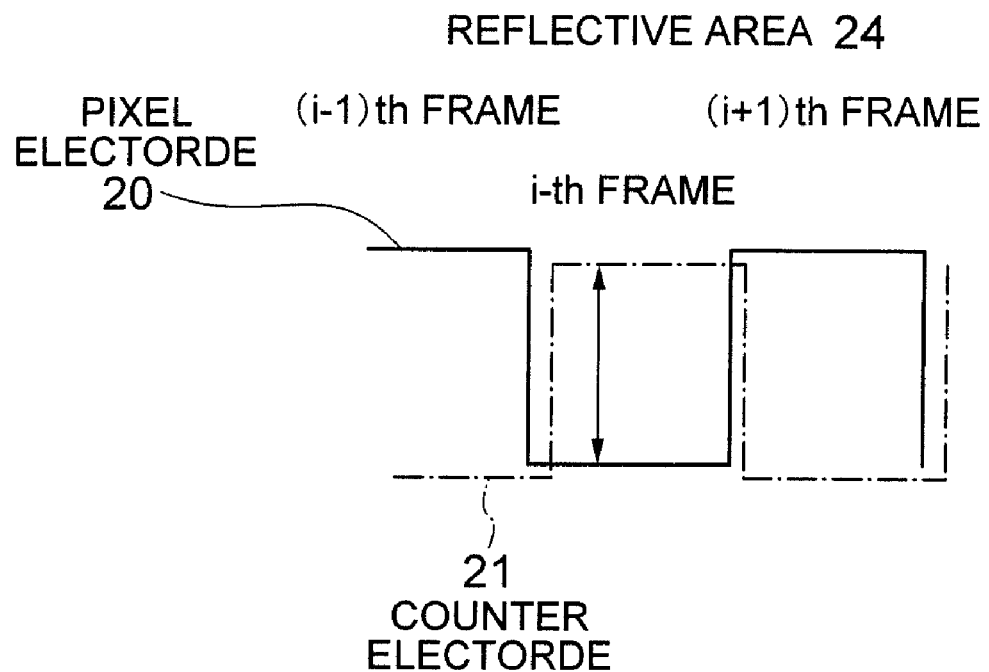
FIGS. 5A and 5B are timing charts showing drive signals for driving the reflective area and transmissive area, respectively.
Figure 5B:
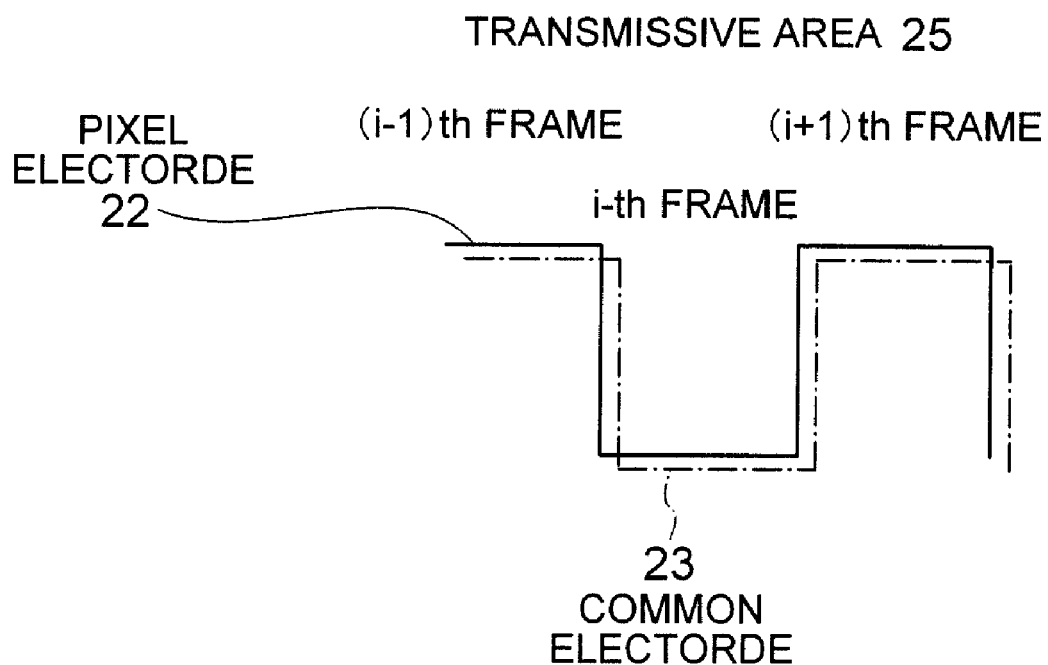

FIGS. 5A and 5B show a timing chart of drive signals supplied to the reflective area 24 and the transmissive area 25, respectively. In these figures, the common-electrode signals and data signal are driven in a gate-line inverting drive scheme wherein those signals are inverted gate line by gate line, or row by row. The first common electrode 23 is applied with a first common-electrode signal, and the counter electrode 21 and second common electrode 35 are supplied with a second common-electrode signal, which has an inverted-polarity relationship with respect to the first common-electrode signal.

Both the pixel electrodes 20, 22 are applied with an arbitrary potential signal between 0V and 5V, for example. Since both the TFTs 33, 34 are connected to the same data line, both the pixel electrodes 20, 22 are provided with the same pixel signal, as understood from FIGS. 5A and 5B. As shown in FIG. 5A, when a data signal of 0V is supplied to the reflective-area pixel electrode 20 and a common-electrode signal of 5V is supplied to the counter electrode 21 in an i-th frame, for example, the LCD layer in the reflective area is driven by a maximum voltage of 5V In this frame, the reflective area 24 represents a dark state due to the normally white mode thereof. On the other hand, in the transmissive area 25, as shown in FIG. 5B, the transmissive-area electrode 23 is applied with 0V in the i-th frame, and thus the LC layer in the transmissive area 25 is driven with 0V. As a result, the transmissive area 25 represents a black state due to the normally black mode thereof.

Figure 6A:
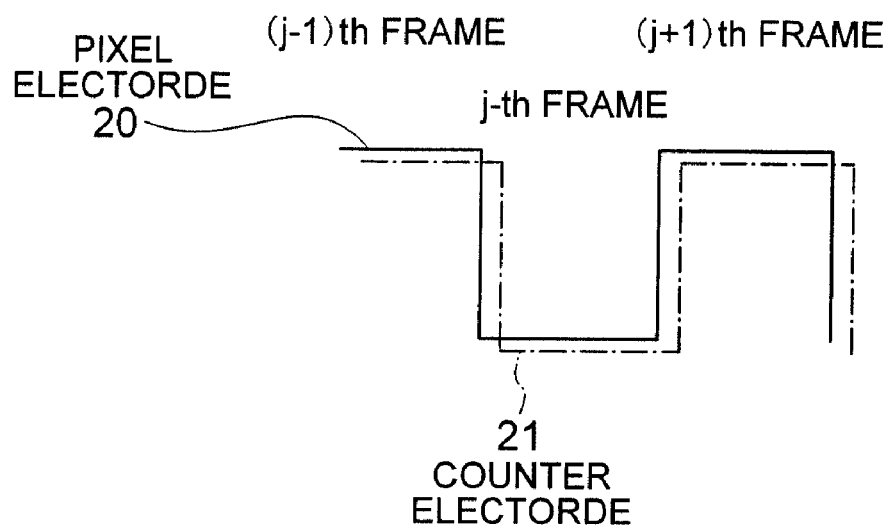
FIGS. 6A and 6B are timing charts showing drive signals for driving the reflective area and transmissive area, respectively.
Figure 6B:
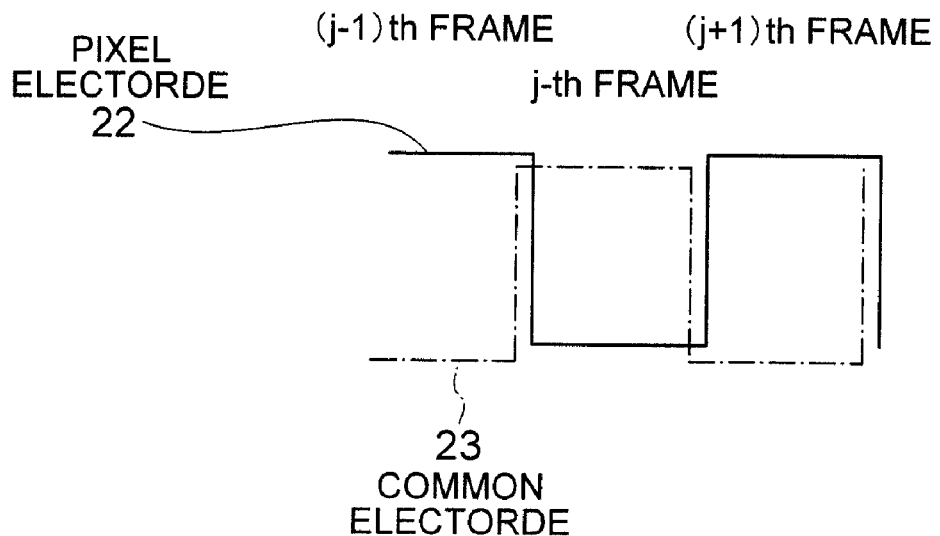

FIGS. 6A and 6B show a timing chart of drive signals similarly to FIGS. 5A and 5B, respectively, in another stage of driving operation. In FIG. 6A, the pixel electrode 20 and the counter electrode 21 are supplied with the same potential in an (i−1)th frame to an (i+1) frame, whereby the LC layer in the reflective area 21 represents a dark state due to the normally white mode thereof. In FIG. 6B, the first common electrode 23 is applied with the first common-electrode signal which is an inverted signal from the second common-electrode signal, whereby the LC layer in the transmissive area 25 is driven with 5V, and represents a bright state due to the normally black mode thereof.

The reason for providing TFTs 33, 34 separately to the reflective area 24 and the transmissive area 25 although both the TFTs 33, 34 are supplied with the same pixel signal will be described hereinafter. It is to be noted that both the reflective area 24 and transmissive area 25 are provided with respective storage capacitances C1, C2, wherein C2 is formed by providing the second common electrode 35 separately from the counter electrode 21, and C1 is formed by the ordinary pixel electrode 22 and the ordinary common electrode 23.

Figure 7A:
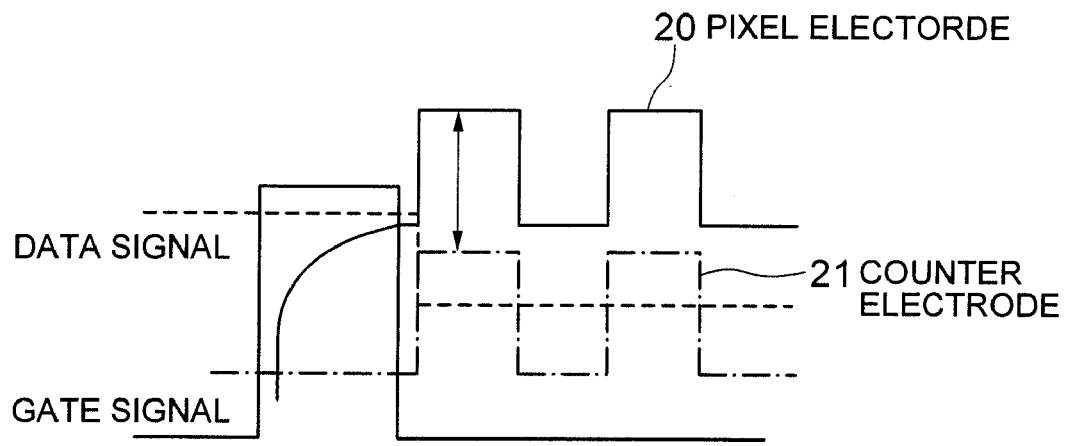
FIGS. 7A and 7B are timing charts showing the potential of the electrodes after writing the drive signal therein.
Figure 7B:
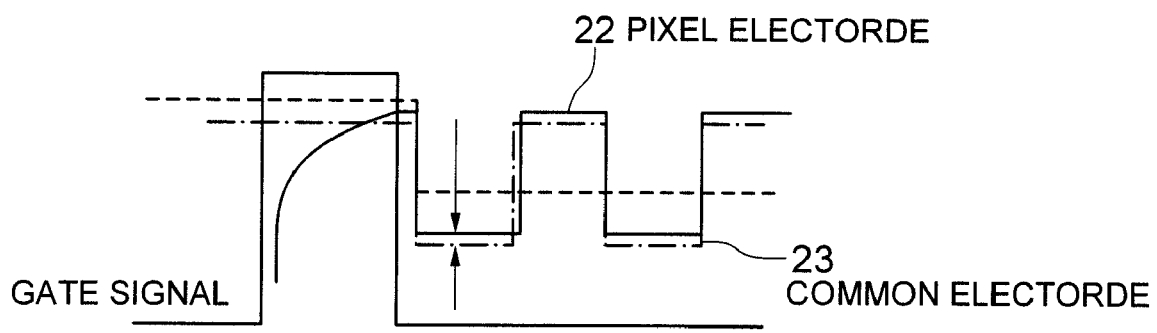

FIGS. 7A and 7B show the potential change of each pixel electrode after supplying the pixel signal to the reflective-area pixel electrode and the transmissive-area pixel electrode, respectively. In order to reverse the polarity of the drive signals in a row-by-row basis in the gate-line inverting drive scheme, the reflective-area counter electrode 21 and transmissive-area common electrode 23 should repeat inversion of polarity in accordance with the polarity inversion in each row, after the gate of TFTs is applied with a gate pulse until another gate pulse is applied for the subsequent frame. In this off-state of TFTs, the reflective-area pixel electrode 20 and transmissive-area pixel electrode 22 may change the polarity of the pixel electrode voltage in synchrony with the polarity change of the common electrode.

Since the transmissive-area common electrode 23 functions as the storage electrode, the potential of the transmissive-area pixel electrode 22 fluctuates due to the capacitive coupling to the transmissive-area common electrode 23 while maintaining the potential difference therebetween, after the TFT 34 is turned OFF to allow the transmissive-area pixel electrode 22 to be separated from the data line and assume a floating state. This situation is shown in FIG. 7B, wherein the potential of pixel electrode 22 is raised to a maximum potential during a high level of the gate signal, and then fluctuates depending on the potential of the common electrode 23 after the gate signal is lowered. On the other hand, in the reflective area 24, the storage electrode (second common electrode) 35 is provided separately from the counter electrode 21, and both the storage electrode 35 and counter electrode 21 are separately coupled to the reflective-are pixel electrode 20 via the storage capacitance and LC capacitance, respectively. Accordingly, if both the counter electrode 21 and reflective-area common electrode 35 are not applied with the same potential signal, and applied with inverted-polarity signals such as the common-electrode signals shown in FIGS. 7A and 7B, the reflective-area pixel electrode 20 cannot follow the potential change of the counter electrode 21 while maintaining the potential difference therebetween.

FIG. 7A shows a desired potential profile, wherein the potential of the reflective-area pixel electrode 20 follows the potential change of the counter electrode 210. For achieving the potential profile of the reflective-area pixel electrode 20 shown in FIG. 7A, a reflective-area common electrode line is provided separately from a transmissive-area common electrode line, and the reflective-area storage capacitor is formed by the reflective-area common electrode 35 and the reflective-area pixel electrode 20 separately from the transmissive-area storage capacitor formed by the transmissive-area pixel electrode and 22 and the transmissive-area common electrode 23. This structure significantly improves the contrast ratio in the reflective area by raising the voltage storage capability of the reflective-area electrodes 20, 21, 35.

Figure 8A:
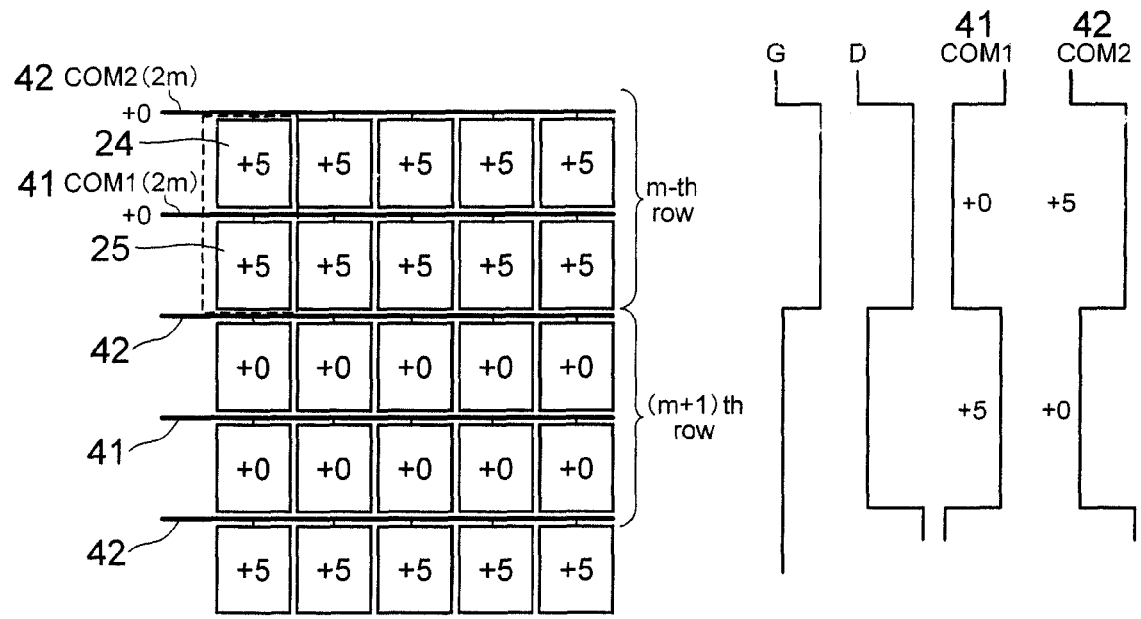
FIGS. 8A and 8B are operation diagrams of the pixels in the array upon display of bright state and dark state, respectively.
Figure 8B:
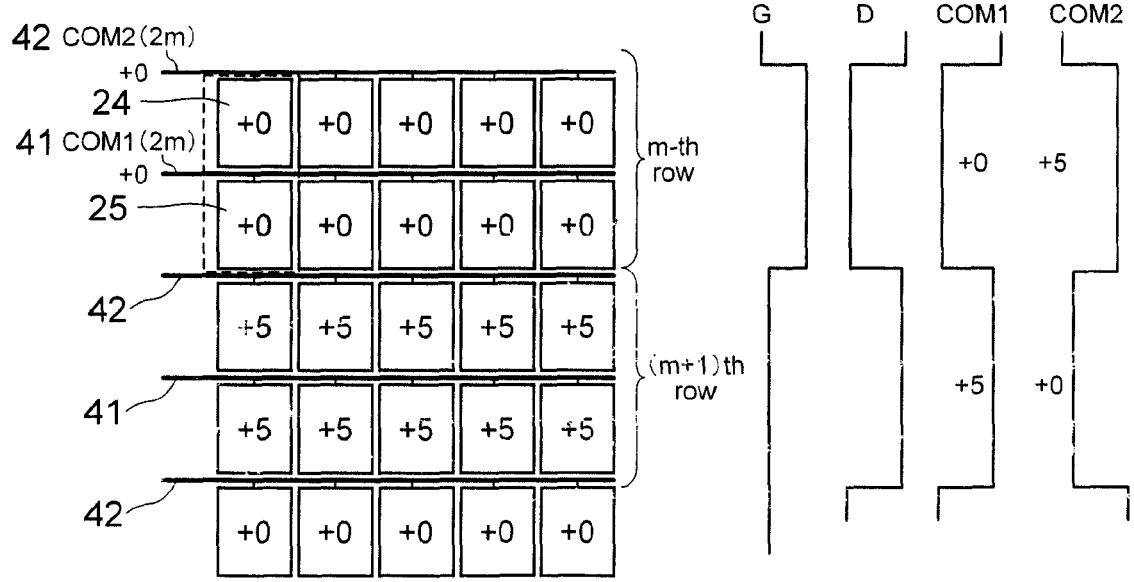

Heretofore, the description of the driving technique is directed to a single pixel in the LCD device. A driving technique for a plurality of rows and a plurality of columns in the LCD device will be described hereinafter. FIGS. 8A and 8B are operation diagrams of the LCD device in different timings, and FIGS. 9A and 9B are top plan views showing the counter substrate 50 and TFT substrate 60, respectively.

Figure 4:
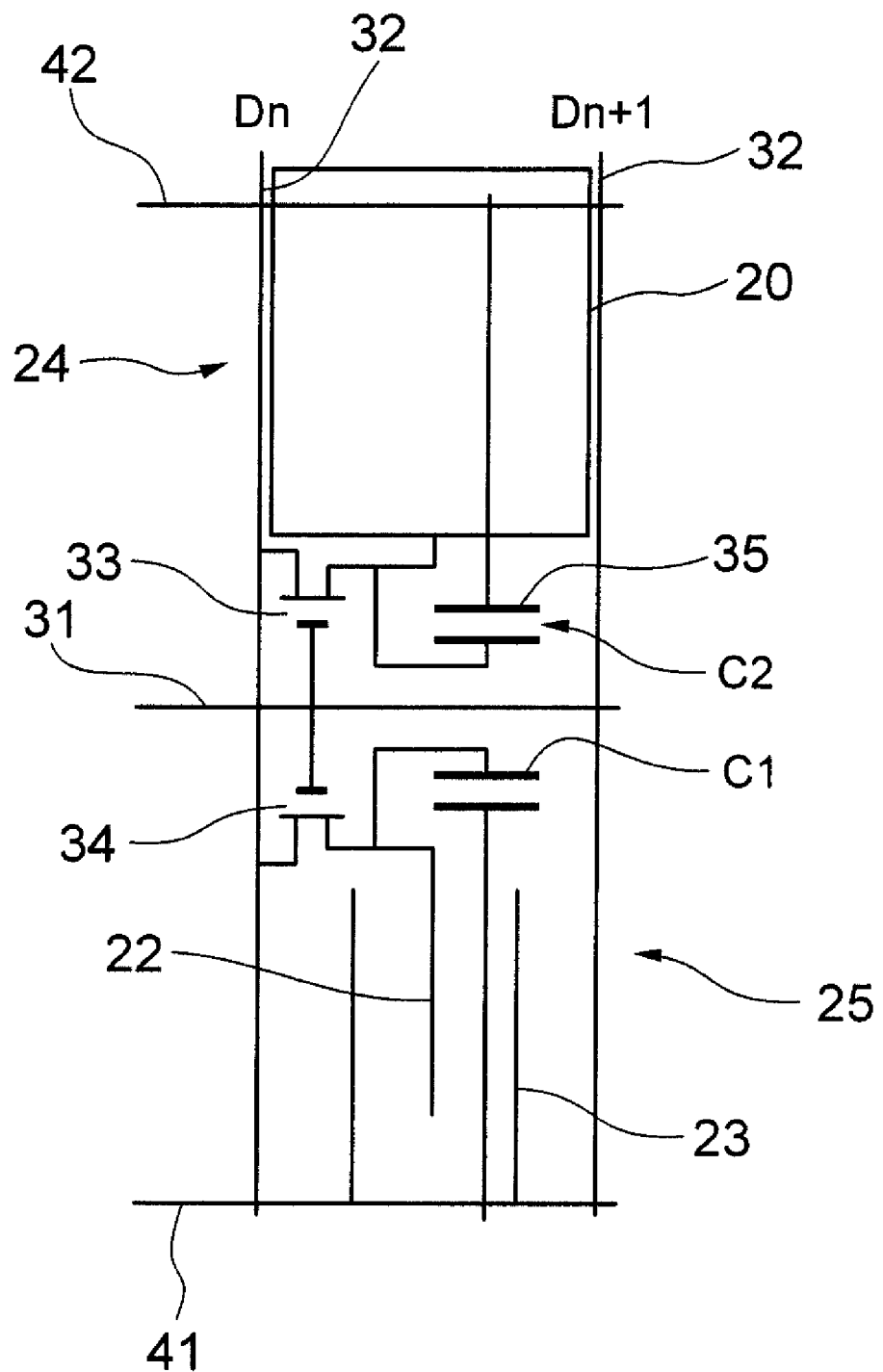
FIG. 4 is a equivalent circuit diagram of the pixel shown in FIG. 1A.

In the LCD device described hereinafter, as shown in FIG. 9A, each reflective area is provided with the reflective-area counter electrode 21 formed on the counter substrate 50, and as described with reference to FIG. 4, each transmissive area 25 is provided with transmissive-area common electrode, or first common electrode 23, formed on the TFT substrate 60. In addition, the reflective area 24 is also provided with the second common electrode 35, which functions as a storage electrode, formed on the TFT substrate 60. The first common electrode 23 is applied with a common-electrode signal, COM, and the second common electrode 35 as well as the counter electrode 21 is applied with an inverted common signal, ~COM, which is obtained by inverting the common-electrode signal, COM. The first and second common electrodes 23, 35 of pixels arranged on a single row are connected to first and second common-electrode lines 41, 42, respectively, which are provided for each row of the pixels. As shown in FIG. 9B, the first common-electrode lines (COM_1 (m)) 41 of a plurality of rows and second common-electrode lines (COM_2(m)) 42 of a plurality of rows are connected to Peripheral_COM_1 line 62 and Peripheral_COM_2 line 63, respectively, which extend in the peripheral area of the LCD device.

A LC driver 51 generates a gate signal, a data signal and a common-electrode signal, COM, based on the pixel signal input thereto and a timing signal. The common-electrode signal is input to a VCOM-IC 52, which generates an inverted COM signal, i.e., ~COM signal. The COM signal is supplied to Peripheral_COM_1 line 62, and the ~COM signal is supplied to Peripheral_COM_2 line 63. The data signal is generated in a gate-line inverting drive scheme, and the COM signal and ~COM signal are also generated in a gate-line inverting drive scheme.

In FIGS. 8A and 8B, signal G, D, COM_1 and COM_2 represent the potential of gate line, pixel signal, first common-electrode signal (COM) and second common-electrode signal (~COM), respectively, in a single frame. The numerals entered in each area of the pixel represents the potential of the pixel signal supplied thereto upon selection of the corresponding row. These signals are generated in the gate-line inverting drive scheme. In one frame, the COM signal is inverted row by row such as 5V, 0V, 5V, 0V, . . . , and similarly thereto the ~COM signal is inverted row by row such as 0V, 5V, 0V, 5V, . . . . In the description to follow, a pixel located on a m-th row and n-th column is denoted by pixel(m,n), the reflective-area common electrode (second common electrode) 35 is denoted by comr(m,n), and the transmissive-area common electrode (first common electrode) 23 is denoted by comt(m,n).

Display of a bright state will be described. In FIG. 8A showing display of a bright state, the reflective-area and transmissive-area pixel electrodes in the pixels on a m-th row have a signal potential of 5V The counter electrode of the reflective areas 24 on the m-th row is connected to COM_2 line 42 supplying the COM signal, which assumes 5V upon selection of the m-th row, from. The transmissive-area common electrode, comt(m,n), is connected to the COM_1(m) line 41 supplying the COM signal, which assumes 0V upon selection of the m-th row. In this case, the LC molecules in the reflective area 24 is applied with a voltage of |(reflective-area pixel-electrode potential)−(reflective-area common-electrode potential)|=0V, whereas the LC molecules in the transmissive area 25 is applied with a voltage of |(transmissive-area pixel-electrode potential)−(transmissive-area common-electrode potential)|=5V. Thus, both the areas represent a bright state.

On the other hand, in the pixels on the (m+1)th row, the reflective-area and transmissive-area pixel electrodes are at 0V, due to the gate-line inverting drive scheme of the pixel potential. The reflective-area counter electrode on the (m+1) th row and the ~COM signal are at 0V upon selection of the (m+1)th row. The transmissive-area common electrode, comt(m+1,n), on the (m+1)th row is connected to COM_1(m+1) line 41, which supplies the COM signal and assumes 5V upon selection of the (m+1)th row. In this case, the LC layer in the reflective area 24 is applied with 0V, and the LC layer in the transmissive area 25 is applied with 5V whereby LC molecules in both the areas represent a bright state. The operation on the (m+2)th row and (m+3)th row is similar to that on the m-th row and (m+1)th row, respectively.

Display of a dark state will be described hereinafter. In FIG. 8B showing display of a dark state, the reflective-area and transmissive-area pixel electrodes on the m-th row have a signal potential of 0V. The reflective-area counter electrode on the m-th row is supplied with the ~COM signal, which assumes 5V upon selection of the m-th row. The transmissive-area common electrode, comt(m,n), on the m-th row is connected to the COM_1(*m*) line 41, which supplies the COM signal and assumes 0V upon selection of the m-th row. In this case, the LC layer in the reflective area 24 is applied with a voltage of |(reflective-area pixel-electrode potential)−(reflective-area common-electrode potential)|=5V, and the LC layer in the transmissive area 25 is applied with a voltage of |(transmissive-area pixel-electrode potential)−(transmissive-area common-electrode potential)|=0V, whereby both the areas on the m-th row represent a dark state.

On the other hand, in the pixels on the (m+1)th row, the reflective-area and transmissive-area common electrodes have a signal potential of 5V due to the gate-line inverting drive scheme of the pixel potential (data line). The reflective-area counter electrode on the (m+1)th row is supplied with the ~COM signal, which assumes 0V upon selection of the (m+1)th row. The transmissive-area common electrode, comt (m+1,n), on the (m+1)th row is connected to the COM_1(*m*+1) line 41, which supplies the COM signal and assumes 5V upon selection of the (m+1)th row. In this case, the LC layer in the reflective area 24 is applied with 5V, and the LC layer in the transmissive area 25 is applied with 0V, whereby both the areas on the (m+1)th row represent a dark state. The operation on the (m+2)th row and (m+3)th row is similar to that on the m-th row and (m+1)th row, respectively.

Detail of the circuit configuration of the common-electrode lines including the Peripheral_COM_1 line and Peripheral_COM_2 line will be exemplified hereinafter. FIG. 9B shows an example of connection for the common-electrode lines in the LCD device. The COM signal output from the LC driver 51 is supplied to the Peripheral_COM_1 line 62, which supplies the COM signal for the transmissive area. The COM signal is also input to the inverting amplifier VCOM-IC 52, which generates the ~COM signal and supplies the ~COM signal to the Peripheral_COM_2 line 63 and the reflective-area counter electrode 21. The VCOM-IC 52 raises (or lowers) the signal amplitude of the ~COM signal to increase (decrease) the drive voltage for the reflective area.

The reason for using a higher (lower) signal amplitude in the reflective area compared to the transmissive area is that the voltage-transmittance (VT) characteristic of the LC layer in the reflective mode using a longitudinal-electric-field mode does not coincide with the voltage-reflectance (VT) characteristic in the transmissive mode using the lateral-electric-field mode, and thus the difference between the VT characteristic and the VR characteristic should be corrected by the amplitude of the VCOM-IC 52. In this correction, the VCOM-IC 52 generates the reflective-area common-electrode signal in consideration of the fact that the reflective-area common-electrode signal has a lower requirement in the image quality compared to the transmissive-area common-electrode signal. In this respect, if the VCOM-IC 52 generates the transmissive-area common-electrode signal from the reflective-area common-electrode signal, and if the drive voltage of the VCOM-IC 52 is changed, the contrast ratio of the transmissive area may be degraded due to the offset voltage of the transmissive-area common-electrode signal upon display of a dark state.

As to the layout configuration of the Peripheral_COM_1 line 62, a plurality of gate lines 31, and the Peripheral_COM_2 line 63, it is preferable that the layout of these lines outside the display area 65, wherein an array of pixels are provide, follows in the order of the Peripheral_COM_1 line 62, gate lines 31 and the Peripheral_COM_2 line 63 as viewed from the display area 65 of the LCD device. The reason for disposing the Peripheral_COM_1 line 62 nearest to the display area 65 is that the Peripheral_COM_1 line 62 supplies a signal to the transmissive area, which requires a higher image quality compared to the reflective area, and thus it is desirable that the Peripheral_COM_1 line 62 have a lower resistance and thus a smaller time constant. The smaller time constant suppresses distortion of the signal waveform of the COM signal and also reduces the lateral cross talk.

Detail of the layout of Peripheral COM lines will be described. In general, the LC driver 51 has a pair of COM terminals at both the ends of the LC driver 51 attached to the LCD panel of the LCD device at one side thereof. Thus, in the present embodiment, the Peripheral_COM_1 line 62 extends from the COM terminals of the LC driver 51 and configures a loop extending along the three sides of the display area 65. The loop of the Peripheral COM lines lowers the voltage drop of the COM lines and thus suppresses distortion of the signal waveform of the COM signal and ~COM signal applied to the pixels.

In the present embodiment, the Peripheral_COM_1 line 62 is formed from a gate (G) layer which is configured to form the gate lines 31, and enters from the LC driver 51 to the display area 65 after crossing a seal member 64 which defines the outer periphery of the display area 65. The seal member 64 is used for sealing the LC layer between the TFT substrate and the counter substrate. After crossing the seal member 64, the Peripheral COM_1 line is connected via through-holes 61 to a data (D) layer which is also configured to form data lines, and extends along the outer periphery of the display area 65 inside the seal member 64. This configuration is adopted because the gate layer is covered by a gate insulation layer and an overcoat layer, whereas the data layer is covered only by the overcoat layer, and thus the gate layer is less likely to be corroded by ingress of water compared to the data layer, especially in the area outside the seal member 64. The gate lines extend from the LC driver 51 and enter the display area 65 after crossing the seal member 64. The gate lines 31 cross the Peripheral_COM_1 line 62 after the Peripheral COM_1 line 62 is configured by the data layer. That is, in this configuration, the Peripheral_COM_1 line 62 can intersect the gate lines 31 at any position within the display area 65.

On the other hand, since the Peripheral_COM_2 line 63 extends from the VCOM_IC 52, the Peripheral_COM_2 line 63 is arranged outside the COM terminals and gate terminals of the LC driver 51. Therefore, the Peripheral_COM_2 line 63 is disposed outside the peripheral gate line as viewed from the display area 65. Since the location outside the gate lines 31 means outside the seal member 64, the Peripheral_COM_2 line 63 is configured by the gate layer. The Peripheral_COM_2 line 63 extends to the peripheral position opposite to the LC driver 51, is subjected to G/D conversion at the through-holes 61 and then again extends toward the LC driver 51 as the data layer within the display area 65 inside the seal member 64. The Peripheral_COM_2 line 63 is introduced into the display area 65 after this G/D conversion.

Figure 10:
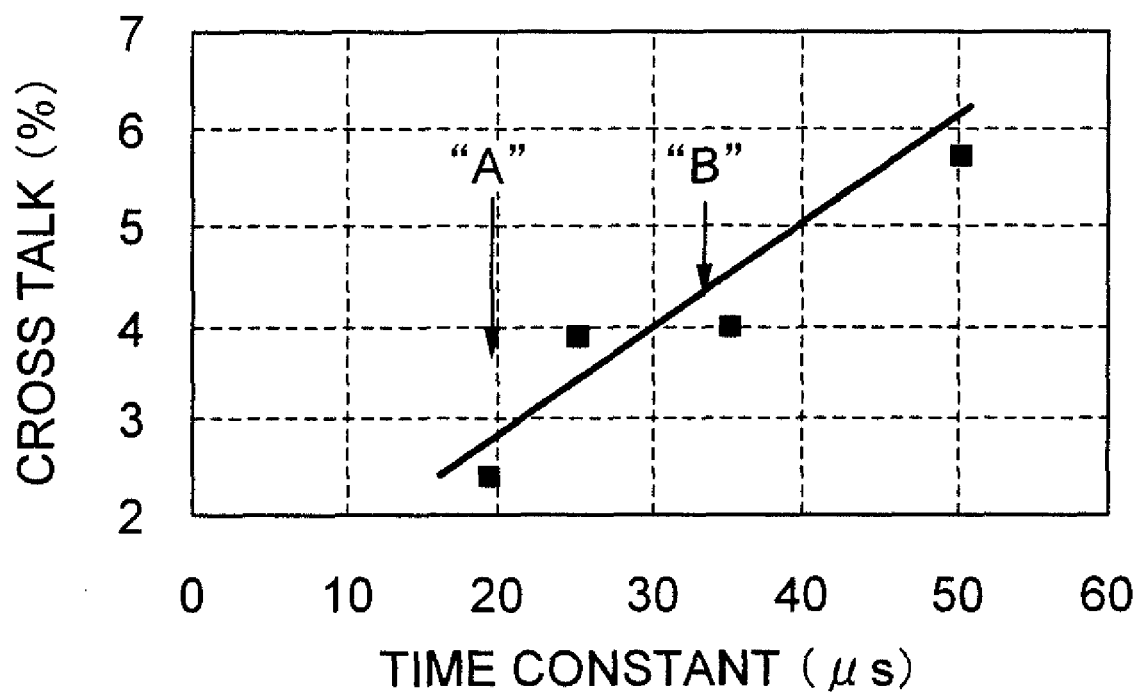
FIG. 10 is a graph showing the relationship between the time constant of the common-electrode line and lateral cross talk.

FIG. 10 shows the relationship between the time constant of COM line and the lateral cross talk. This figure exemplifies a Cr metal extending as the Peripheral_COM_1 line 62 on a 3.5" QVGA (240×320) panel. If the Peripheral_COM_1 line 62 extends outside the Peripheral_COM_2 line, the time constant may assume 35 microseconds as indicated by "B" in the graph, which cause a 4%-level cross talk. On the other hand, as shown by "A" in the graph, if the Peripheral_COM_1 line 62 extends inside the Peripheral_COM_2 line, the time constant may assume 20 microseconds, which reduces the cross talk down to a 2% level.

The VCOM-IC 52 eliminates the DC component of the transmissive-area COM signal by using a capacitor, then inverts the same, and amplifies in voltage if needed. The VCOM-IC 52 is configured so that the center value of the inverted COM signal may be adjusted in an offset control circuit. In general, if the center value of the transmissive-area and reflective-area common-electrode signals is deviated from a flicker minimum voltage, a flicker is generated. In addition, the flicker minimum value is generally different between the reflective area 24 and the transmissive area 25 depending on the way of TFT leakage current and the storage capacitance of the reflective/transmissive area. By inputting the transmissive-area COM signal after eliminating the DC component thereof, and adjusting the center value of the COM signal in an offset adjusting circuit, it is possible to suppress the flicker in both the reflective area and transmissive area. The suppression of the flicker eliminates the DC component from the LC layer, thereby achieving a transflective LCD device having a higher resistance against both burning and stain of the screen.

Figure 11A:
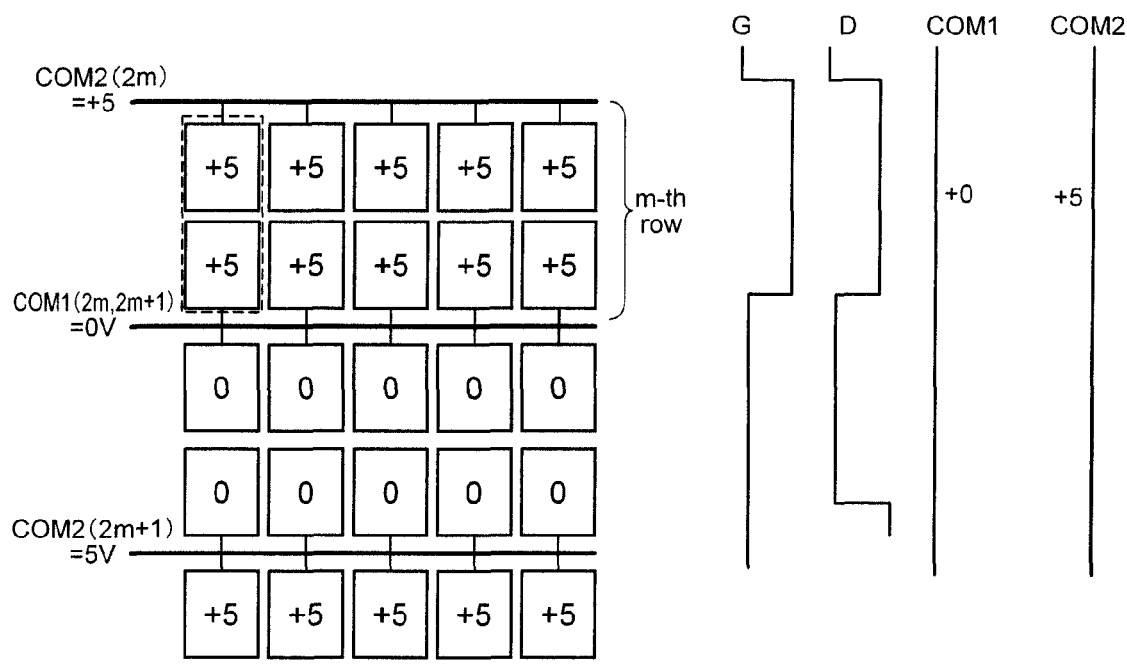
FIGS. 11A and 11B are operation diagrams of the pixels in the array upon display of bright state and dark state, respectively.
Figure 11B:
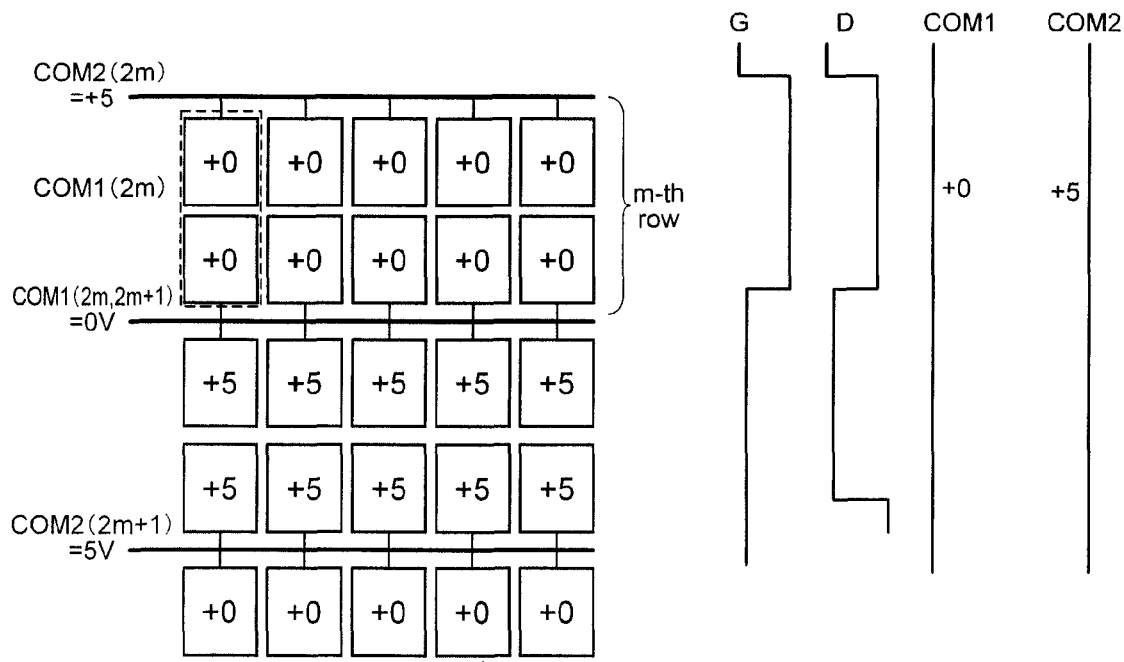
Figure 12:
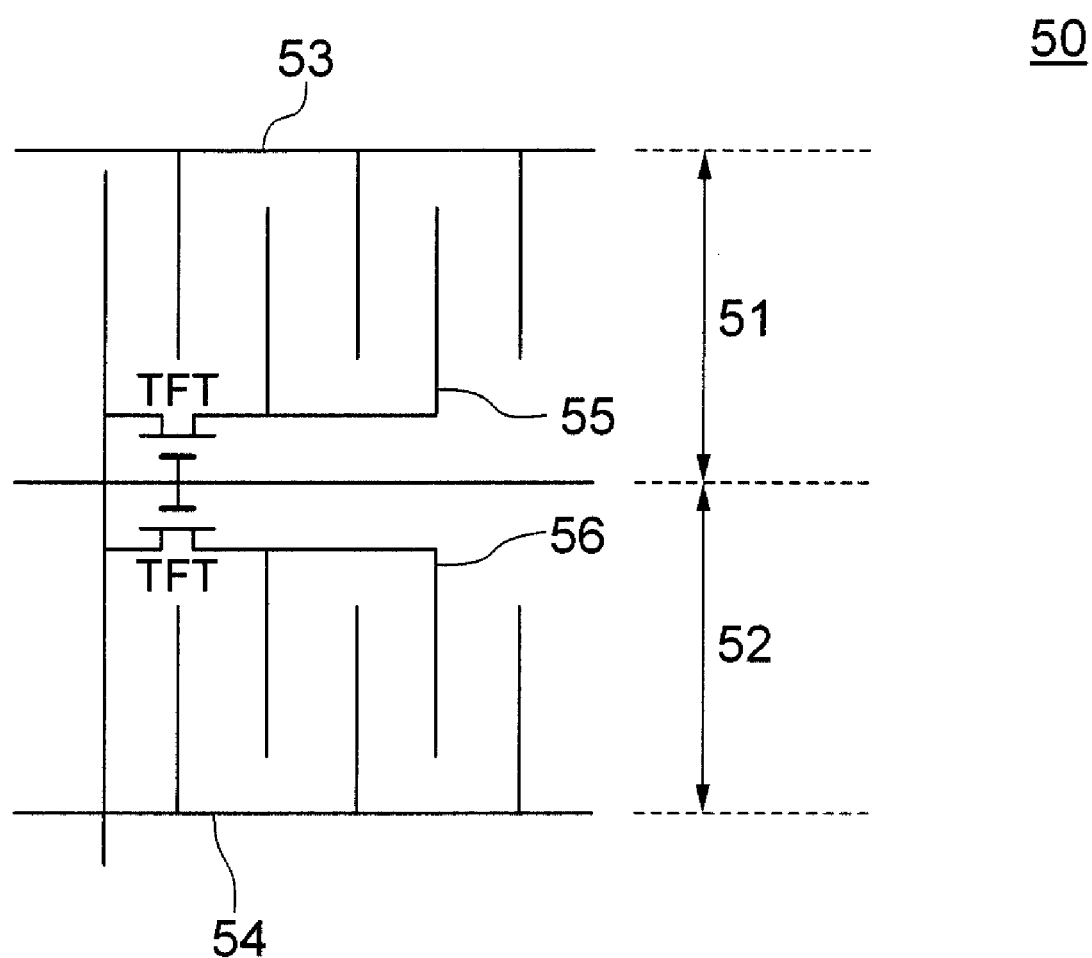
FIG. 12 is a circuit diagram of a pixel in a LCD device described in a patent publication.

Although the above description is directed to an example of the LCD device using a gate-line inverting scheme, the technique described in JP-2005-338256A may be used so long as the reflective area and transmissive area include respective storage electrodes. In addition, the configuration shown in FIGS. 8A and 8B may be modified to obtain a configuration shown in FIGS. 11A and 11B. In this modification, the pixel electrodes are driven in a gate-line inverting scheme, and both the common-electrode lines, COM_1 and COM_2, are driven in a frame inverting drive scheme. COM_1 line is connected to the transmissive-area common electrode on the m-th row and the reflective-area common electrode on the (m+1)th row, for example, and COM_2 line is disposed alternately with the COM_1 line and connected to the reflective-area common electrode on the (m+1))th row and the transmissive-area common electrode in the (m+2)th row. In this case, the frame inverting drive scheme reduces the power dissipation of the LCD device.

A process for manufacturing the LCD device of the above embodiment will be described hereinafter. The TFT substrate may be manufactured using the process described in JP-200741572A, and will be omitted for description while incorporating the disclosure of this publication into the text by reference. For manufacturing the counter substrate, color filter layers and an overcoat film are formed on a glass substrate, followed by forming a retardation film thereon. More specifically, a horizontal orientation film having a function for defining the slow axis of the retardation film is formed on the overcoat layer or planarization film by coating. The horizontal orientation film is subjected to a burning treatment. The horizontal orientation film is then subjected to a rubbing treatment or optical alignment treatment for providing an orientation function to the horizontal orientation film. An optically-curable LC monomer is then coated onto the horizontal orientation film, and then heated to have a desired orientation direction. Thereafter, the LC monomer is irradiated with an ultraviolet ray for curing, thereby obtaining the retardation film therefrom. The retardation film is controlled to have a retardation of a quarter wavelength of the light by adjusting the concentration of the coating liquid as well as the condition for the coating.

Thereafter, the retardation film is selectively patterned, to be left on the reflective area of the pixels. A resist film is then formed on the resultant retardation film by coating, and patterned to have a pattern of the reflective area. The resultant structure is then subjected to an oxygen-plasma ashing treatment, to remove a portion of the retardation film exposed from the resist pattern. An ITO (indium-tin-oxide) film is then formed, covered with a resist film, and patterned using a photolithographic etching technique, thereby forming the counter electrode in the reflective area. The ITO covering the retardation film suppresses generation of unevenness or stain on the resultant LCD panel, which may otherwise be caused by a solvent of the orientation film on the retardation film during the fabrication process of the LCD device.

In the exemplary method of the present embodiment, the retardation film is manufactured by a patterning technique using a resist film. However, the retardation film may be formed by patterning using the photosensitivity provided to the material for the retardation film. In addition, the above example is such that the counter electrode and the retardation film are separately patterned; however; the retardation film may be patterned using the counter electrode as a mask. The process described heretofore provides the counter substrate. Subsequently, the counter substrate and the TFT substrate separately manufactured are provided with an orientation film. The orientation film is subjected to a rubbing treatment so that the LC layer is homogeneously oriented in a direction 5 to 30 degrees inclined from the direction parallel to the comb-teeth electrodes including transmissive pixel electrode and common electrode. Spacer members are then scattered within the space of the LC layer, followed by bonding together the TFT substrate and counter substrate by using a seal member and injecting the LC into the cell gap between the TFT substrate and the counter substrate. The resultant panel is then cut into a plurality of LCD panels, which are then assembled with the polarizing films and a LC driver etc.

The LCD device manufactured by the above process is driven using a longitudinal-electric-field mode in the reflective area, and lateral-electric-field mode in the transmissive area. Introduction of the $\lambda/4$ film and arrangement of the optical axis of the polarizing film which is parallel or perpendicular to the major axis of the LC molecules allowed the reflective area to suitably operate in the transmissive mode as well as the reflective mode. In this operation, the reflective area operates in a normally white mode, whereas the transmissive area operates in a normally black mode; however, use of a signal-inverting drive scheme allowed both the areas to operate in association with each other. The longitudinal-electric-field mode used for operating the reflective area improved the aperture ratio of the LCD device. The term "aperture ratio" means an effective pixel area to the total pixel area, and thus a larger aperture ratio provides a higher luminescence. The arrangement of the reflective-area and transmissive-area pixel electrodes suppressed the boundary between the longitudinal-electric-field mode and the lateral-electric-field mode from entering the transmissive area.

In the above embodiment, a second common electrode is provided in the reflective area separately from the counter electrode. Thus, the reflective-area storage capacitor is formed between the second common electrode and the reflective-area pixel electrode, in addition to the transmissive-area storage capacitor formed between the first common electrode and the transmissive-area pixel electrode. This configuration improved the image quality of the reflective area. The specific arrangement of the peripheral common-electrode lines also improved the image quality in the transmissive area. The control of the two common-electrode signals separately from each other with respect to the signal amplitude and the center value of the signal amplitudes suppresses occurring of the flicker in both the reflective area and the transmissive area.

In the above embodiment, the quarter wavelength film ($\lambda/4$ film) has an optical axis set at 45 degrees away from the optical axis of the front polarizing film; however, the angle may be modified from 45 degrees to 135 degrees. The λ/4 film may be added with a λ/2 film to configure a two-layer structure for increasing the wavelength range of light. The pixel electrode and common electrode in the transmissive area may be configured by different conductive layers. The present invention may be applied to a lateral-electric-field-mode LCD device including a fringe-field-switching-mode LCD device although the above embodiment is applied to the IPS-mode LCD device as an example.

The transmissive-area pixel electrode or transmissive-area common electrode may be disposed at the boundary between the transmissive area and the reflective area. It is preferable that if a portion of the transmissive-area pixel electrode is disposed at the boundary, the counter electrode does not oppose the portion of the transmissive-area electrode. The pixels may be driven in a dot inverting drive scheme. The LCD device of the above embodiment is suitably used in a portable unit such as cellular phone, personal computer, portable game machine.

While the invention has been particularly shown and described with reference to exemplary embodiment and modifications thereof, the invention is not limited to these embodiment and modifications. It will be understood by those of ordinary skill in the art that various changes in form and details may be made therein without departing from the spirit and scope of the present invention as defined in the claims.

What is claimed is:

1. A liquid crystal display device comprising:
   a liquid crystal panel which includes first and second substrates sandwiching therebetween a liquid crystal layer and defines an array of pixels each including a reflective area and a transmissive area, said transmissive area including a first pixel electrode and a first common electrode for generating therebetween a lateral electric field, said reflective area including a second pixel electrode and a counter electrode for generating therebetween a longitudinal electric field;
   a quarter-wavelength retardation film disposed in said reflective area in front of said liquid crystal layer; and
   first and second polarizing films sandwiching therebetween said liquid crystal panel, liquid crystal molecules in said liquid crystal layer having a major axis parallel or perpendicular to an optical axis of said first polarizing film disposed in front of said liquid crystal panel,
   wherein the quarter-wavelength retardation film does not overlap with the transmissive area.

2. A liquid crystal display device comprising:
   a liquid crystal panel which includes first and second substrates sandwiching therebetween a liquid crystal layer and defines an array of pixels each including a reflective area and a transmissive area, said transmissive area including a first pixel electrode and a first common electrode for generating therebetween a lateral electric field, said reflective area including a second pixel electrode and a counter electrode for generating therebetween a longitudinal electric field;
   a quarter-wavelength retardation film disposed in said reflective area in front of said liquid crystal layer; and
   first and second polarizing films sandwiching therebetween said liquid crystal panel, liquid crystal molecules in said liquid crystal layer having a major axis parallel or perpendicular to an optical axis of said first polarizing film disposed in front of said liquid crystal panel,
   wherein an angle between an optical axis of said quarter-wavelength retardation film and said optical axis of said first polarizing film is 45 degrees or 135 degrees.

3. The liquid crystal display device according to claim 1, wherein said first pixel electrode and said first common electrode each have a portion extending in a direction parallel to a boundary between said reflective area and said transmissive area.

4. The liquid crystal display device according to claim 3, wherein said first pixel electrode is disposed in a vicinity of said boundary.

5. A liquid crystal display device comprising:
   a liquid crystal panel which includes first and second substrates sandwiching therebetween a liquid crystal layer and defines an array of pixels each including a reflective area and a transmissive area, said transmissive area including a first pixel electrode and a first common electrode for generating therebetween a lateral electric field, said reflective area including a second pixel electrode and a counter electrode for generating therebetween a longitudinal electric field;
   a quarter-wavelength retardation film disposed in said reflective area in front of said liquid crystal layer; and
   first and second polarizing films sandwiching therebetween said liquid crystal panel, liquid crystal molecules in said liquid crystal layer having a major axis parallel or perpendicular to an optical axis of said first polarizing film disposed in front of said liquid crystal panel,
   wherein said first pixel electrode and said first common electrode each have a portion extending in a direction parallel to a boundary between said reflective area and said transmissive area,
   wherein said first pixel electrode is disposed in a vicinity of said boundary, and
   wherein said first pixel electrode does not oppose said counter electrode in a vicinity of said boundary.

6. The liquid crystal display device according to claim 3, wherein said first common electrode is disposed in a vicinity of said boundary.

7. The liquid crystal display device according to claim 6, wherein said first common electrode opposes said counter electrode in said vicinity of said boundary.

8. A liquid crystal display device comprising:
   a liquid crystal panel which includes first and second substrates sandwiching therebetween a liquid crystal layer and defines an array of pixels each including a reflective area and a transmissive area, said transmissive area including a first pixel electrode and a first common electrode for generating therebetween a lateral electric field, said reflective area including a second pixel electrode and a counter electrode for generating therebetween a longitudinal electric field;
   a quarter-wavelength retardation film disposed in said reflective area in front of said liquid crystal layer; and
   first and second polarizing films sandwiching therebetween said liquid crystal panel, liquid crystal molecules in said liquid crystal layer having a major axis parallel or perpendicular to an optical axis of said first polarizing film disposed in front of said liquid crystal panel,
   wherein said reflective area further includes a second common electrode for configuring a storage capacitor in association with said second pixel electrode, said second electrode and said counter electrode is driven in a first drive signal, and said first common electrode is driven by a second drive signal having an inverted-polarity relationship with respect to said first drive signal.

9. The liquid crystal display device according to claim 8, wherein a first peripheral common-electrode line supplying a first common-electrode signal to said first common electrode and a second peripheral common-electrode line supplying a second common-electrode signal to said counter electrode and said second common electrode extend outside a display area receiving therein said pixels, and said first peripheral common-electrode lines is disposed nearer to said display area than said second peripheral common-electrode line.

10. The liquid crystal display device according to claim 8, wherein said first pixel electrode and said second pixel electrode receive a pixel signal through separate switching members.

11. The liquid crystal display device according to claim 1, wherein said first and second pixel electrodes, said first common electrode and said counter electrode are driven in a gate-line inverting drive scheme.

12. The liquid crystal display device according to claim 1, wherein said pixels are driven in a dot inverting drive scheme.

13. The liquid crystal display device according to claim 8, wherein said first and second pixel electrodes are driven in a gate-line inverting drive scheme, and said second common electrode and said counter electrode are driven in a frame inverting drive scheme.

14. The liquid crystal display device according to claim 8, wherein a first common-electrode signal supplied to said first common electrode and a second common-electrode signal supplied to said counter electrode and said second common electrode have respective signal amplitudes, and the center values of both said signal amplitudes are controlled independently of each other.

15. A terminal unit comprising the liquid crystal display device according to claim 1.

16. The liquid crystal display device according to claim 1, wherein the quarter-wavelength retardation film is disposed only in said reflective area.

17. The liquid crystal display device according to claim 1, wherein said quarter-wavelength retardation film is sandwiched between said first and second substrates.

18. The liquid crystal display device according to claim 1, wherein no quarter-wavelength retardation film is provided in back of said liquid crystal layer.

* * * * *